Oct. 20, 1931.  F. D. WILLIAMS  1,827,924
PICTURE PROCESS
Filed April 9, 1928   2 Sheets-Sheet 1
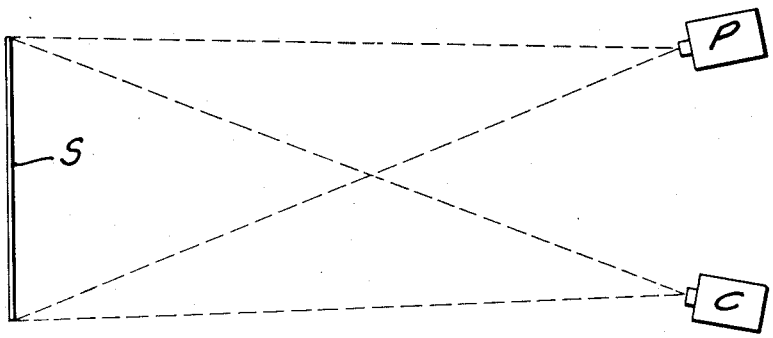
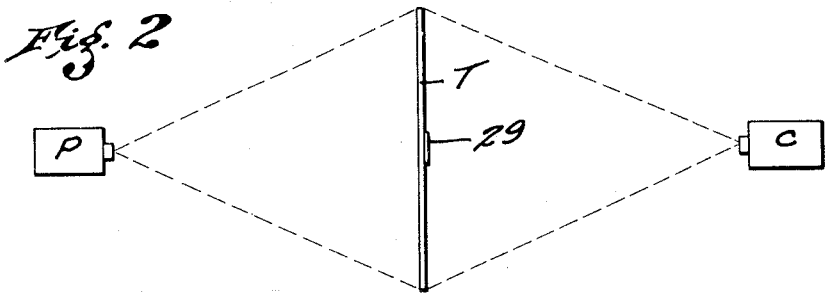
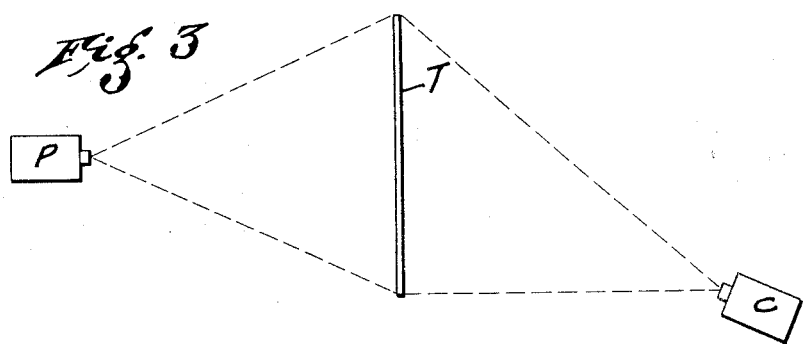
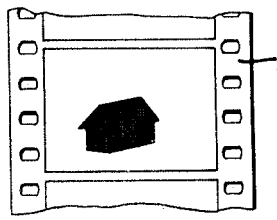
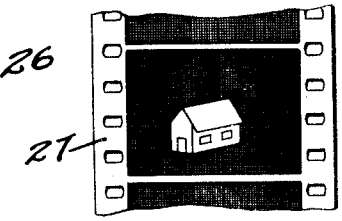
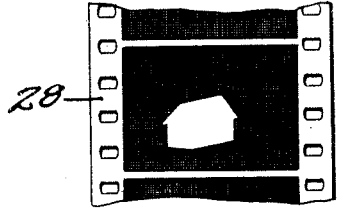
INVENTOR.
Frank D. Williams
BY Westall and Wallace
ATTORNEYS Oct. 20, 1931.  F. D. WILLIAMS  1,827,924
PICTURE PROCESS
Filed April 9, 1928   2 Sheets-Sheet 2
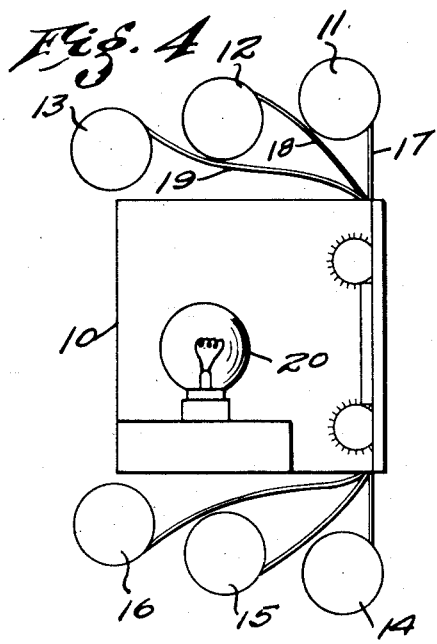
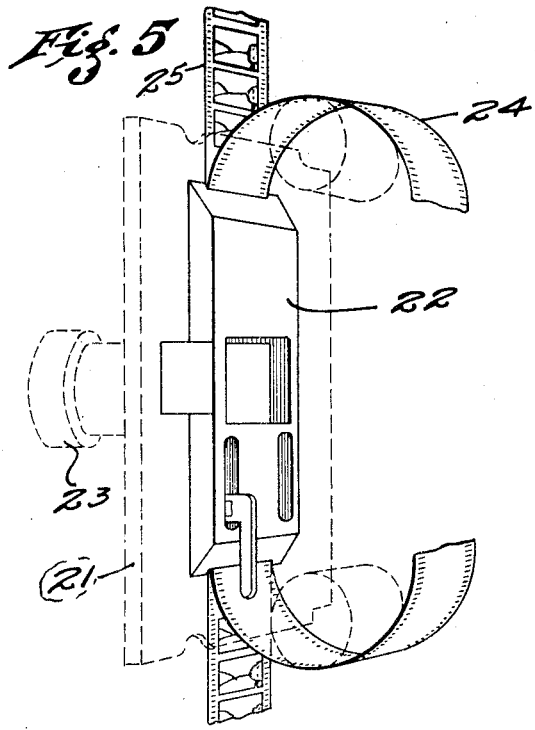
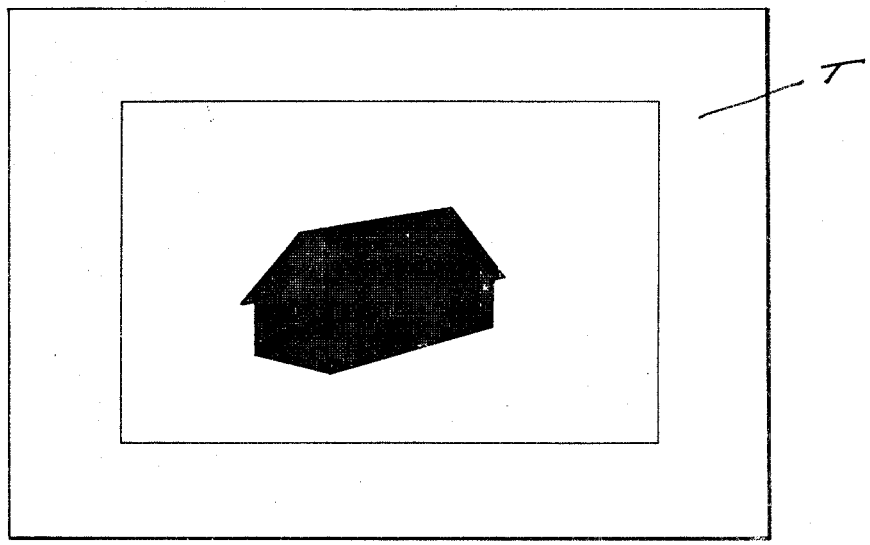
INVENTOR.
Frank D. Williams
BY Westall and Wallace
ATTORNEYS Patented Oct. 20, 1931

1,827,924

UNITED STATES PATENT OFFICE

FRANK D. WILLIAMS, OF LOS ANGELES, CALIFORNIA

PICTURE PROCESS

Application filed April 9, 1928. Serial No. 268,482.

This invention relates to a method of copying projectable pictures, and has a large field of usefulness in cinematographic work, especially in the production of composite pictures.

There are instances in which it is desirable to project a picture for the purpose of locating an image and to either adjust its position or size for protographic copying, supplementing it with another component image, toning the light, or a combination of such steps as may be found desirable. In some instances, it may be desirable to copy a silhouette figure. This may be done by projecting the silhouette on a picture perceptible medium such as a projection screen and then copying by photographing the projected image. Such specific uses of the invention are hereinafter set forth more in detail.

The present invention has for its primary object the provision of a method of projecting the picture images on the picture perceptive medium and then copying the same therefrom. Another object of this invention is to provide a method whereby a picture may be projected on a picture perceptive medium and then photographed, adding, during the photographing, supplemental picture images to the light impression on the sensitized medium whereon the picture is photographed.

Other objects and advantages will be made fully apparent from the following specification considered in connection with the accompanying drawings, wherein certain means or instrumentalities are shown to illustrate the invention.

In the drawings, Fig. 1 is a schematic view showing the method of copying by projecting a picture upon a screen and reflecting the light rays, the projected picture being photographed; Fig. 2 is a schematic view showing means for projecting the picture to be copied upon a light transmissive screen and photographing from the side of the screen opposite to the projector; Fig. 3 is a schematic view showing a modification of the method illustrated in Fig. 2, but with the camera offset from the focal axis of the projector; Fig. 4 is a diagrammatic view of a projector which may be used; Fig. 5 is a perspective view of the film feeding mechanism of a cemera printer; Fig. 6 is a face view of the screen with a silhouette thereon; Fig. 7 is a view of a silhouette mat; Fig. 8 is a reverse mat with a regular picture corresponding to the silhouette shown in Fig. 7; and Fig. 9 is a stencil mat.

Referring with more particularity to Fig. 1, a projector is marked P and a reflecting screen is indicated by S. The screen is of a character such that an image projected thereon will be perceptible. Mounted adjacent the projector and in front of the screen is a camera C, which may be a camera printer.

Referring to Fig. 4, the projector may be of a type well known in the art and comprises as essentials a dark box 10, a plurality of film magazine reels, and a corresponding number of take-up reels. In the present instance there are three magazine reels indicated by 11, 12 and 13, and a corresponding number of take-up reels 14, 15 and 16. The strips of film 17, 18 and 19 passing from the magazine reels to the take-up reels are superposed over one another. Within the dark box is a lamp 20 for projecting the images contained on the films. The camera printer shown in Fig. 5 is of a like nature having a dark box 21, an aperture plate 22 and a lens system 23. A plurality of magazine and take-up reels are provided. In Fig. 5 two films are shown superposed over one another and indicated by 24 and 25. It will be understood however, that any desired number of films may be employed, the magazine reels and take-up reels necessary for the number of films employed will form a part of the camera printer mechanism.

Any image desired may be projected from the projector P upon the screen S. It will also be obvious that images from two or more superposed films may be projected upon the screen. Assuming that one film is being used, the size of the image on the screen may be varied by manipulation of the projector and also the position of the image on the screen. This image may then be photographed by means of the camera C. As an illustration of a use, a film 26, see Fig. 7, having an image thereon in silhouette is projected upon the screen. In the camera are two films, one having a supplementary component shown thereon, such as a background. This supplementary component is on the film 25. Film 24 is a sensitized or raw stock film. Light which passes into the camera will therefore light impress the background on the raw stock. If the light is that reflected from the screen, a latent stencil of the silhouette image would be produced on the raw stock. This stencil area may later be printed in by transmitting to the area a light impression of a regular picture corresponding to the silhouette. This may be done by projecting upon the screen S a reverse silhouette 27, see Fig. 8, that is, a reverse silhouette constituting a stencil with the image corresponding to the silhouette being a regular picture. Thus, in Fig. 7 a silhouette mat is shown with a silhouette and in Fig. 8 is a reverse mat with a regular picture. In the steps just described, it may be found desirable to tone some of the components. This may be done by varying the intensity of the light in the areas desired as by touching up the screen to vary the intensity of light passing to the raw stock, interposing other screens, gauzes, films or light diffusers between the projector and camera. In some instances it may be desirable to make a stencil mat 28 without a regular picture therein. In this instance, the mat 26 may be projected upon the screen and photographed by the camera C. Such projection permits relocation of the image, enlargement or decrease in size. From the stencil mat, a silhouette mat may be made, and the steps of making a composite picture proceeded with. It will be apparent that a silhouette mat and a background film may be placed in the projector and a light impression made upon a sensitized film in camera C. The reverse mat 27 shown in Fig. 8 may then be superposed over the light impressed sensitized film and the regular image printed into the latent stencil area. There are other numerous variations of the steps which may be followed in completing a desired picture. Among these is painting a picture on the projection screen to form one component or using a translucent screen having an enlarged photograph.

In Fig. 2, a projector is indicated by P and the camera printer by C. Interposed between the projector and camera is a light transmissive screen indicated by T. Any image that is projected on the light transmissive screen may be photographed by the camera C. In Fig. 2, the projector and camera are shown having the same focal axis. In this instance, there may be an image 29 of the source of light projected upon the screen T. In order to avoid photographing the image of the source of light, the camera printer is shown offset from the focal axis as shown in Fig. 3.

What I claim is:—

1. In a motion picture process, the method of copying pictures which comprises projecting primary component silhouette pictures of ultimate composite pictures upon an opaque picture perceptive screen, light impressing a sensitized medium with a supplementary component, by aid of the light from said screen with the silhouette projected thereon so as to produce a latent stencil area.

2. In a motion picture process, the method of copying pictures which comprises projecting primary component silhouette pictures of ultimate composite pictures upon an opaque picture perceptive medium, light impressing a sensitized plate with a supplementary component by aid of the light from said medium with the silhouette projected thereon so as to produce a latent stencil area and light impressing the stencil area with a regular picture corresponding to said silhouette.

In witness that I claim the foregoing I have hereunto subscribed my name this 8th day of March, 1928.

FRANK D. WILLIAMS.